BALLAST APPARATUS HAVING A PORTION TUNED TO A HARMONIC FREQUENCY

Filed July 11, 1962

INVENTORS
ALBERT FEINBERG
PAUL BERGER
BY Morris Spector
ATTY.

United States Patent Office 3,195,012
Patented July 13, 1965

3,195,012
BALLAST APPARATUS HAVING A PORTION TUNED TO A HARMONIC FREQUENCY

Albert E. Feinberg and Paul Berger, Chicago, Ill., assignors to Advance Transformer Co., Chicago, Ill., a corporation of Illinois Filed July 11, 1962, Ser. No. 209,118
13 Claims. (Cl. 315—99)

This application is a continuation in part of our co-pending application, Serial No. 786,367, filed November 13, 1959, now Patent 2,984,072 and relates to electric ballasts for starting and operating negative resistance devices such as fluorescent lamps, and the electrical circuits involved.

Our application above mentioned discloses a high leakage reactance transformer in a circuit such that when commercial alternating voltage is applied thereto, which is sinusoidal and say 60 cycles, the output voltage will be of the frequency of the applied voltage but with a superimposed odd harmonic above the third, preferably the seventh or the ninth. This result is obtained by using a transformer magnetic structure that has one or more bridged air gaps in which saturation effects are produced by a circuit that is tuned to the desired harmonic.

The tuned circuit includes a condenser. During operation of the lamps this condenser is discharged twice for each cycle of the fundamental voltage (once for each half cycle). During operation of the lamps at the moments of reignition thereof as they pass through each half cycle the discharge of the tuning condenser produces an inrush of current through the lamp because the lamp itself acts as a very low impedance relative to the condenser discharge and lacks the ability to stop the condenser discharge through the lamp. This current inrush tends to be of a very sharp peak. It is one of the objects of the present invention to eliminate the objectionable periodic sharp peak inrush of current through the lamp during the operation thereof due to the discharge of the condenser which takes place at twice the fundamental frequency of the applied voltage. The peak discharge current inrush is at a frequency considerably above the frequency of the harmonic to which the circuit is tuned.

In view of the fact that the circuit arrangement is such that the tuning condenser in the tuning circuit does not have to carry the lamp current, and the current through the tuning condenser is small, a choke can be placed in series with the tuning condenser to control the discharge thereof. The choke should be an audio choke which will operate at a high reactance when the frequency is relatively high compared to the harmonic frequency. This would be in the high audio frequency range. On this basis, in order to get the maximum effectiveness of the reactor the reactor should operate with a relatively low core saturation. This is obtained by using a reactor having a steel magnetic core that forms an incomplete magnetic circuit.

It is a further object of the present invention to provide a ballast wherein an odd harmonic is produced to superimposed peaks upon the fundamental to create higher voltages and wherein there is provided means for discharging a condenser that is used in the production of the harmonics, the discharge arrangement being such as to prevent the discharging condenser from causing high peaked voltages to be applied to the apparatus that is operated by the ballast.

The attainment of the above and further objects of the present invention will be apparent from the following specification taken in conjunction with the accompanying drawing forming a part thereof.

In the drawing.

Reference may now be had more particularly to the drawing wherein like reference numerals designate like parts throughout.

Figure 1:
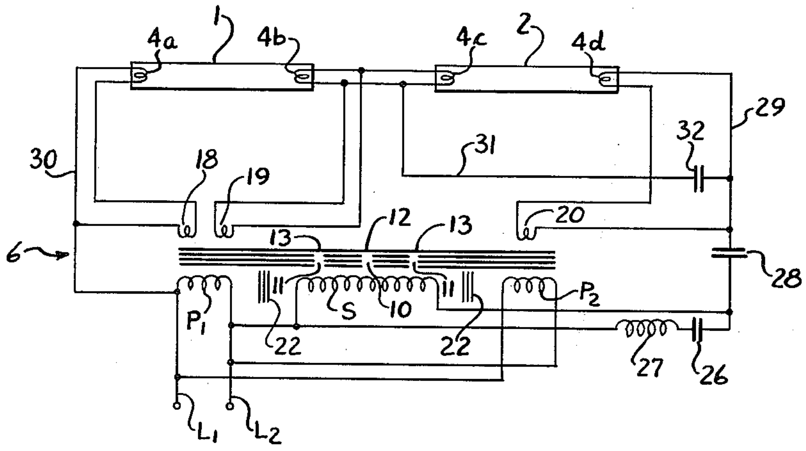
FIG. 1 is a diagrammatic circuit illustrating one preferred embodiment of the present invention.

In the drawing, 1 and 2 designate fluorescent lamps of the type that are provided with cathode heating elements 4—4 and adapted for operation in a rapid-start series-sequence type of circuit. Each lamp may be a 96″ T–12 high output lamp or a 72″ T–12 high output lamp. These lamps take about 800 milliamperes of current. In a rapid-start series-sequence circuit two identical lamps are connected in series for series operation from a source of voltage lower than the combined starting voltages of the two lamps. One of the lamps is shunted by a small condenser to provide current for starting the other lamp, which is the first to start lamp. Thereafter, the shunted lamp starts, all as is well known in the art.

A high leakage reactance ballast 6 is provided for operating the two lamps 1 and 2. The ballast includes a primary which comprises two coils $P_1$ and $P_2$ connected in parallel and adapted to be connected to input terminal leads $L_1$ and $L_2$ that are to be connected to a standard commercial source of alternating current of a given frequency and voltage. In this instance the frequency is 60 cycles, the voltage of the order of 120 volts. The input voltage wave is substantially sinusoidal. The ballast 6 also includes a secondary S that is located between the two primary coils $P_1$ and $P_2$. The secondary is connected in step-up transformer relationship with both of the primary winding coils $P_1$ and $P_2$. The primary and secondary together with the iron structure constitute a transformer. The transformer is a high leakage reactance transformer. It is a shell type transformer and includes an iron core structure coupling the primaries and the secondaries. The iron core includes a stack of identical T-shaped laminations 7 and two stacks of identical L-shaped laminations in conventional assembly. Each lamination 7 has a central slot 10 between two slots 11—11. The slots form non-magnetic gaps bridged at 12 and 13, by a magnetic bridge of appropriate cross section.

The transformer has three small coils 18, 19 and 20 for providing heating current to the heating elements 4*a*, 4*b*, 4*c* and 4*d* of the two lamps 1 and 2. Two of the windings 18 and 19 may be wound on the primary $P_1$ and one of the windings 20 wound on the other primary $P_2$. The heating windings being wound on the respective primaries will be closely coupled to their respective primary coils and loosely coupled with respect to the secondary S.

The secondary S is loosely coupled with respect to the primary coils $P_1$ and $P_2$. The loose coupling may be obtained merely by the spacing between the secondary and the primary. If the secondary is relatively long in relation to its diameter this spacing may be very short. The loose coupling may also be obtained by means of iron shunts 22—22 between the secondary and the respective primaries. The iron structure may be of stacks of laminations in general of the shapes shown in any of the embodiments of our application above referred to, except that the slots 10 and 11 are located in positions to be surrounded by the secondary.

A condenser 26 is connected in series with a choke 27 across the secondary S. The loop circuit including the secondary S, condenser 17 and choke 27 is tuned to resonate at a desired odd harmonic of the applied line frequency. The odd harmonic is preferably the 5th, 7th or 9th, the 7th being most desirable, in most instances. A condenser 28 is connected in series between one output lead 29 and the secondary. Another output lead is indicated at 30. A third output lead 31 and a condenser 32 shunt the lamp 2 for starting purposes, as heretofore stated and known in the art.

The choke 27 comprises a spool of fine wire, which spool may be rectangular in cross section. The interior of the rectangle is filled with identical laminations 35 of magnetic steel that extend the full length of the spool. These laminations constitute a magnetic core which forms an incomplete iron circuit for the magnetic lines of flux generated by the winding of the choke 27. The path of the magnetic flux generated by the choke 27 is mainly through air, not through iron. The choke 27 therefore has very little inductive reactance at the frequency of the generated harmonic (the fifth, seventh, or ninth) and therefore has very little effect upon the tuning of the circuit. However, at higher frequencies the inductive reactance of the choke becomes appreciable. Before starting of the lamps 1 and 2 the tuned circuit comprising the secondary, the condenser 26 and the choke 27 resonate at the desired odd harmonic of the line frequency and thereby superimpose a peak voltage for quick starting of the lamps, all as more fully set forth in our above application to which reference may be had. The lamp 1 starts first. During its starting the condenser 32 shunts the lamp 2 and thereby provides starting current for the lamp 1. Thereafter the voltage across the lamp 1 drops considerably. The voltage across the output leads 29–30 is then sufficient to start the lamp 2 in series with the already started lamp 1.

During operation of the lamps the lamp current does not have to flow through the choke 27 and condenser 26. Therefore, a relatively small wire size can be used for the choke 27.

During operation of the lamps the lamp current passes through a zero value twice in each cycle of an applied voltage. Therefore, twice during each such cycle the condenser 26 discharges. At this time, but for the choke 27 there would be a sharply peaked current inrush through the lamps since the lamps having a very low impedance relative to the condenser discharge would not have the ability to stop the condenser discharge. This peak current is at a rate which is the equivalent of a frequency considerably in excess of the harmonic frequency, in this instance the seventh, to which the loop circuit including the secondary S, condenser 26 and choke 27 is tuned. The choke has a relatively high reactance at the high frequency referred to above, which is a multiple of the harmonic frequency and is in the high audio range. At this high audio frequency range it is desirable that the choke have a relatively low core saturation. The magnetic steel core constitutes less than 50% of the entire flux path of the flux generated by the choke. This results in a substantial saving in the amount of iron required for the choke.

Figure 2:
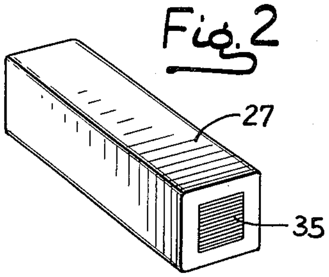
FIGS. 2 and 3 are perspective views of an alternate choke construction for use in the ballast of FIG. 1.
Figure 3:
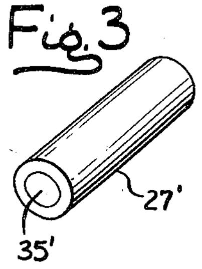

Because of the low alternating current flowing through the condenser 26 and the low flux density of the choke 27 it is possible to use a plain cold rolled steel rod as the core for the choke 27. Such an arrangement is illustrated in FIG. 3 wherein the choke 27' is a spool circular in cross section and its core 35' comprises a cold rolled steel rod substantially filling the inside of the coil that constitutes the spool of the choke 27' and extending the full length thereof. In one construction this rod was of a diameter ⅜" and a length 1¾". The laminated construction of FIG. 2, is, however, more effective because it operates at a lower temperature.

In one preferred construction the secondary coil $S_2$ was approximately 5 inches in length. The slot 10 was at the center of the secondary and slots 11—11 were centered 1¼ inches from the center of the slot 10. The stem of the T-shaped lamination 7 was 1.070 inches wide and the slot 10 extended across 0.735 inch of the width of the stem 7, that slot being 0.110 inch wide, which means that the air gap was 0.110 inch long. Each of the bridges 12—12 were therefore 0.167 inch wide. Each of the slots 11—11 was 0.660 inch long and 0.190 inch wide, which means that each slot 11 produced an air gap 0.190 inch long and that the bridged portion 13 on each side of each air gap 11 was 0.205 inch. The stacks of laminations of the transformer and of the core were each about 1¼ thick. The choke 27 was approximately 1½" long. It consisted of 628 turns of wire arranged in six layers on a cardboard tube about 7/16" x ⅝" in cross section. In the case of the choke of FIG. 3 there were approximately 800 turns in eight layers on a cardboard tube ⅜" in diameter x 1¾" long.

Figure 4:
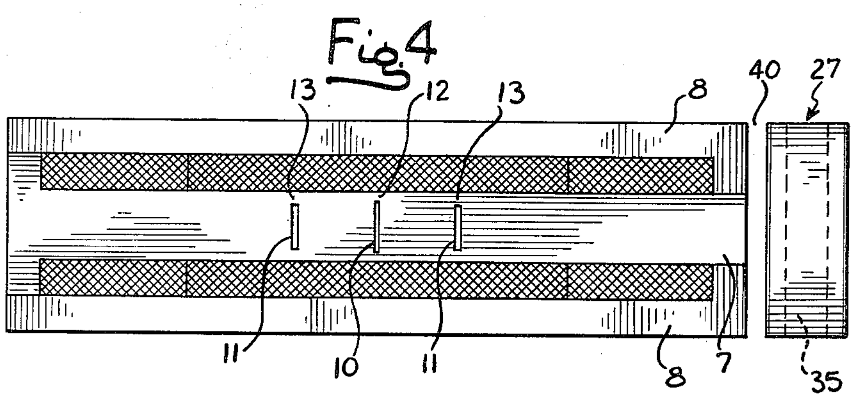
FIG. 4 is a diagrammatic top plan view of the transformer of the ballast of the present invention, the coils being shown in section for illustrative purposes, and the reactor being shown in position next to the transformer.

The choke 27 is located adjacent to the transformer. The space 40 between them is shown in FIG. 4 in exaggerated form to illustrate that the reactor is not dependent upon the iron of the transformer to form part of the magnetic circuit of the reactor. In some cases, the iron laminations 35 of the choke may be omitted and the reactor placed in abutment with the transformer whereby the gap 40 is reduced in a negligible amount so that the iron at the end of the transformer provides a part of the magnetic path for the magnetic lines of force generated by current flowing through the reactor coil.

In compliance with the requirements of the patent statutes we have herein shown and described a preferred embodiment of the present invention to illustrate the principles of the invention. What is new and sought to be secured by Letters Patent is:

1. In combination with low pressure gaseous discharge apparatus having negative resistance characteristics, a device for operating said apparatus from a source of substantially sinusoidal alternating voltage of a given frequency, said device having an input circuit adapted to be connected to said source and an output circuit adapted to be connected to said apparatus, said device comprising a transformer and means for accentuating in said transformer an odd harmonic above the third to an extent over all the other harmonics of said frequency so that the harmonic of maximum accentuation is an odd harmonic above the third, said means for accentuating said harmonic comprising a condenser and inductive means in circuit with one another, the inductive means being at least a part of said transformer, said transformer including an iron core having a high reluctance gap with a saturating magnetic bridge thereacross with the bridge located in the magnetic circuit of the inductive means, said condenser and inductive means being substantially tuned to said harmonic, and a reactor in series with the condenser and carrying substantially none of the current flowing through the output circuit during normal operation of the discharge apparatus.

2. In combination with low pressure gaseous discharge apparatus having negative resistance characteristics, a device for operating said apparatus from a source of substantially sinusoidal alternating voltage of a given frequency, said device having an input circuit adapted to be connected to said source and an output circuit adapted to be connected to said apparatus, said device comprising a transformer and means for accentuating in said transformer an odd harmonic above the third to an extent over all the other harmonics of said frequency so that the harmonic of maximum accentuation is an odd harmonic above the third, said means for accentuating said harmonic comprising a condenser and inductive means in circuit with one another, the inductive means being at least a part of said transformer, said transformer including an iron core having a high reluctance gap with a saturating magnetic bridge thereacross with the bridge located in the magnetic circuit of the inductive means, said condenser and inductive means being substantially tuned to said harmonic, and a reactor in series with the condenser and carrying substantially none of the current flowing through the output circuit during normal operation of the discharge apparatus, said reactor having a magnetic core comprising only a fractional portion of the magnetic circuit of the reactor, a substantial portion of the flux path of the reactor being non-magnetic.

3. In combination, a high leakage magnetic core transformer having a saturating portion and having an input circuit adapted to be connected to a source of alternating current of a given frequency and substantially sinusoidal and having also an output circuit, the input circuit including a primary and the output circuit including a secondary, negative resistance electric discharge apparatus connected for energization from said output circuit, means for producing in the output circuit a voltage wave which is of the given frequency with an accentuated superposed odd harmonic above the third and below the tenth and of a magnitude above that of all other harmonics that may be present, said means including a condenser and a choke in series with one another and shunted by at least a portion of the secondary, said choke and condenser carrying substantially none of the current that flows through the output circuit during normal operation of the discharge apparatus.

4. In combination, a high leakage magnetic core transformer having a saturating portion and having an input circuit connected to a source of alternating current of a given frequency and substantially sinusoidal and having also an output circuit, the input circuit including a primary and the output circuit including a secondary, negative resistance electric discharge apparatus connected for energization from said output circuit, means for producing in the output circuit a voltage wave which is of the given frequency with an accentuated superposed seventh harmonic of a magnitude above that of all other harmonics that may be present, said means including a condenser and a choke in series with one another and shunted by at least a portion of the secondary, said choke and condenser carrying substantially none of the current that flows through the output circuit during normal operation of the discharge apparatus.

5. In combination, a high leakage magnetic core transformer having a saturating portion and having an input circuit connected to a source of alternating current of a given frequency and substantially sinusoidal and having also an output circuit, the input circuit including a primary and the output circuit including a secondary, negative resistance electric discharge apparatus connected for energization from said output circuit, means for producing in the output circuit a voltage wave which is of the given frequency with an accentuated superposed ninth harmonic of a magnitude above that of all other harmonics that may be present, said means including a condenser and a choke in series with one another and shunted by at least a portion of the secondary, said choke and condenser carrying substantially none of the current that flows through the output circuit during normal operation of the discharge apparatus.

6. A high reactance ballast for a negative resistance discharge apparatus comprising in combination a transformer having a magnetic core having primary and secondary winding sections, a primary winding on the primary section of the core adapted to be connected to a source of alternating current of a given frequency, a secondary winding located on the secondary section of the core for supplying starting voltage and operating current to output leads that are to be connected to negative resistance discharge apparatus, means forming a gap with a saturating bridge across it in the secondary core section, and means for particularly accentuating an odd harmonic above the third over the other rarmonics of the given frequency, said accentuating means including at least a portion of the secondary and a condenser in a loop circuit tuned to said harmonic, and a reactor in series with the condenser and carrying substantially none of the current flowing through the output leads when the ballast is in operation.

7. A ballast of claim 6 wherein said reactor has a magnetic core comprising only a fractional portion of the magnetic flux path of the reactor and with a majority of the magnetic flux lines through the reactor extending through non-magnetic material for at least 10% of their length.

8. In a combination defined in claim 1, an additional condenser in series with the discharge apparatus in the output circuit.

9. In a combination defined in claim 2, an additional condenser in series with the discharge apparatus in the output circuit.

10. In a combination defined in claim 3, an additional condenser in series with the discharge apparatus in the output circuit.

11. In a combination defined in claim 4, an additional condenser in series with the discharge apparatus in the output circuit.

12. In a combination defined in claim 5, an additional condenser in series with the discharge apparatus in the output circuit.

13. In a combination defined in claim 6, an additional condenser in series with the discharge apparatus in the output circuit.

References Cited by the Examiner

UNITED STATES PATENTS 1,035,405 8/53 Feinberg ------------- 315—138

FOREIGN PATENTS 2,682,014 6/54 France.

GEORGE N. WESTBY, *Primary Examiner.*